(12) United States Patent
Gramellini et al.

(10) Patent No.: US 9,181,385 B2
(45) Date of Patent: Nov. 10, 2015

(54) POLYURETHANES AND POLYURETHANE-UREAS HAVING IMPROVED PROPERTIES

(75) Inventors: Alessandro Gramellini, Castelfranco Emilia (IT); Ermes Gramellini, Castelfranco Emilia (IT)

(73) Assignee: TECNOELASTOMERI S.R.L., Castelfranco Emilia (Modena) (IT)

( * ) Notice: Subject to any disclaimer, the term of this patent is extended or adjusted under 35 U.S.C. 154(b) by 83 days.

(21) Appl. No.: 13/570,461

(22) Filed: Aug. 9, 2012

(65) Prior Publication Data

US 2013/0053463 A1 Feb. 28, 2013

(30) Foreign Application Priority Data

Aug. 30, 2011 (IT) .............................. MI2011A1557

(51) Int. Cl.
| | |
|---|---|
| C08G 18/76 | (2006.01) |
| C08G 18/12 | (2006.01) |
| C08G 18/30 | (2006.01) |
| C08G 18/32 | (2006.01) |
| C08G 18/42 | (2006.01) |
| C08G 18/10 | (2006.01) |
| C08G 101/00 | (2006.01) |

(52) U.S. Cl.
CPC ............ *C08G 18/7664* (2013.01); *C08G 18/10* (2013.01); *C08G 18/12* (2013.01); *C08G 18/302* (2013.01); *C08G 18/3206* (2013.01); *C08G 18/42* (2013.01); *C08G 18/4202* (2013.01); *C08G 18/4238* (2013.01); *C08G 18/4277* (2013.01); *C08G 2101/0083* (2013.01)

(58) Field of Classification Search
CPC ......... C08G 18/10; C08G 18/42; C08G 18/12
USPC ....................................................... 521/159
See application file for complete search history.

(56) References Cited

U.S. PATENT DOCUMENTS

| 4,280,007 | A | 7/1981 | Meisert et al. |
| 6,964,626 | B1 * | 11/2005 | Wu et al. ....................... 474/260 |
| 2006/0058455 | A1 | 3/2006 | Michels et al. |
| 2007/0049684 | A1 * | 3/2007 | Rische et al. ................. 524/589 |
| 2007/0093632 | A1 * | 4/2007 | Ghesquiere ..................... 528/44 |
| 2010/0112333 | A1 * | 5/2010 | Cameron et al. ............ 428/315.5 |
| 2010/0130632 | A1 * | 5/2010 | Speas ............................ 521/159 |
| 2010/0230879 | A1 | 9/2010 | Watanabe |

OTHER PUBLICATIONS

Italian Search Report dated Mar. 19, 2012, corresponding to the Foreign Priority Application No. MI20111557.

* cited by examiner

*Primary Examiner* — Melissa Rioja
(74) *Attorney, Agent, or Firm* — Young & Thompson

(57) ABSTRACT

A microcellular polyurethane or polyurethane-urea foam elastomer includes the reaction product of (A) with (B) and/or water, a blowing agent, a catalyst forming urethane and/or ureic groups wherein:
(A) is a prepolymer having a —NCO free group content included between 2%-25% (% w/w), which includes the reaction product of
  (a1) one or more aliphatic, cycloaliphatic and/or aromatic diisocyanates excluding 3,3'-dimethyl-4,4'-diphenylene diisocyanate, or one or more polyisocyanates or mixture of diisocyanates and polyisocyanates;
  with
  (a2a) one or more polyester macrodiols, a number of —OH groups per molecule equal to about 2;
(B) is a compound selected from
  (b1) a diol or polyol;
  (b2) a primary or secondary aliphatic, cycloaliphatic amine or aliphatic, cycloaliphatic aromatic disecondary diamine or a blocked amine;
  (b3) one or more polyester macrodiols having a number of —OH group per molecule equal to about 2;
  (b4) a mixture formed of two or more compounds (b1), (b2) and (b3).

15 Claims, No Drawings

POLYURETHANES AND POLYURETHANE-UREAS HAVING IMPROVED PROPERTIES

FIELD OF THE INVENTION

The present invention refers to microcellular polyurethanes and polyurethane-ureas foams having an improved combination of properties such as, for example, a high elastic recovery of deformation (low compression set), resistance to abrasion, resistance to chemicals (for example oils) and water, and to the use thereof in the production of manufactured articles suitable for withstanding high variable loads and vibrations, for example shock absorbers for railway lines (pads), rollers for the preparation of paper, dampers, shock absorbers, bumpers for cars and similar.

In particular the present invention refers to manufactured articles obtained from said polyurethanes and polyurethane-ureas which show a low compression set, low volumetric expansibility in oil, in combination with good load resistance, resistance to abrasion, impact strength at low temperatures ($-70°$ C.) and good mechanical properties in general.

BACKGROUND OF THE INVENTION

Polyurethanes and polyurethane-ureas are widely used in the manufacture of various products such as expanded foam for padding, elastomers for the automotive industry, and have a density and rigidity which varies over a wide range. These properties depend on numerous factors including the structure of the reactants, and on the used additives and catalysts.

The improvement of a specific property inevitably entails the modification of other properties since it is obtained by modifying a component or the preparation process, hence obtaining the combination of desired properties is very difficult or even impossible.

This limit is particularly true when the material must combine good mechanical properties such as resistance to loads and vibrations, which require a relatively rigid structure, with a high elastic recovery of the form after compressive stress is released (low compression set) which is generally obtained with softer polymers.

When, in addition to the above-mentioned combination, good resistance to abrasion and adequate chemical resistance are required, the possibility of finding a material which has all the desired properties is further reduced.

This is typically the case of materials used in variable and/or temporary load or vibration conditions, in the presence of moving mechanical parts, in various temperature and humidity conditions, in which the elastic deformation must be immediately recovered.

An example of said materials is represented by the shock absorbers for railway lines positioned below the sleepers and/or below the rails (railway bumpers and railway pads) as such and/or through supports and/or installation structures: they must have, in addition to a low compression set, generally below 20, a high resistance to static and dynamic loads (vibrations), and therefore a static rigidity (ratio between load and deformation sustained) and dynamic rigidity as required by the specifications of the sector.

SUMMARY OF THE INVENTION

The object of the present invention is to provide polyurethanes and polyurethane-ureas having improved properties of elastic recovery of deformation (elastic response-compression set) and resistance to abrasion, in combination with good mechanical resistance to variable and/or temporary loads or vibrations, in the presence of moving mechanical parts, in various temperature and humidity conditions, with resistance to chemicals (oils) and water, thus allowing trains to reach higher speeds when these polymers are in form of railway pads.

A further object of the present invention is to provide said polyurethanes and polyurethane-ureas having the above-mentioned combination of properties also in the presence of oils and furthermore having a resistance to chemicals and water such as to present a low volumetric expansibility.

A further object of the present invention is to provide said polyurethanes and polyurethane-ureas also endowed with a static and dynamic rigidity such as to make them suitable for the production of improved shock absorbers for railways lines (railway bumpers and pads), rollers for working/preparing sheets of paper (paper industry), shock absorbers and similar, and bumpers for cars.

These objects are achieved by the polyurethanes and polyurethane-ureas having the characteristics listed in the attached independent claim 1.

Advantageous embodiments of the invention appear in the dependent claims.

A first subject of the invention is a microcellular foam elastomer of a polyurethane or polyurethane-urea which comprises the reaction product of a reactant (A) with a reactant (B) where:

(A) is a prepolymer having a content of unreacted —NCO groups (free groups) in the range 2%-25% (% by weight) which comprises the reaction product of or is the reaction product of
(a1) one or more aliphatic, cycloaliphatic and/or aromatic diisocyanates excluding 3,3'-dimethyl-4,4'-diphenylene diisocyanate (TODI), or one or more polyisocyanates, or mixtures of said diisocyanates and polyisocyanates;
with
(a2a) one or more macrodiols belonging to the polyester class, preferably selected from polyadipates and polycaprolactones, having a number average molecular weight between 600-6000 and a number of —OH groups per molecule equal to approximately 2; or mixtures thereof,
said macrodiols (a2a) being optionally in admixture with:
(a2b) one or more macropolyols belonging to the polyester class, preferably polyadipates and polycaprolactones, having a number average molecular weight in the range 300-6000, preferably 500-4500, and a number of —OH groups per molecule in the range 3-8, preferably 3-4;
said mixture (a2a)+(a2b) being such as to have an average hydroxyl functionality below 3;
and wherein
(B) is a compound chosen from
(b1) a diol or polyol with molecular weight or number average molecular weight below 500;
(b2) a primary or secondary aliphatic, cycloaliphatic amine or aliphatic, cycloaliphatic aromatic disecondary diamine, or protected amine (blocked amine), with molecular weight below 500, or mixtures thereof, more preferably ethylenediamine, diethylenetriamine, or mixtures thereof;
(b3) one or more macrodiols belonging to the polyester class, preferably polyadipates and polycaprolactones, having a number average molecular weight in the range 500-6000 and a number of —OH groups per molecule equal to approximately 2; or mixtures thereof, (b4) a mixture of two or more compounds (b1), (b2) and (b3) indicated above, one or more of said compounds (b1), (b2), (b3), (b4) being optionally in admixture with:

(a2b) one or more macropolyols belonging to the polyester class, preferably polyadipates and polycaprolactones, having a number of —OH groups per molecule in the range 3-8, preferably 3-4, and a number average molecular weight in the range 300-6000, preferably 500-4500, the mixture forming the reagent (B) being such as to have an average hydroxyl functionality below 3;

said reaction product of (A)+(B) being obtained in the presence of water and/or a physical and/or chemical blowing agent, and a catalyst for formation of the urethane and/or ureic groups.

DETAILED DESCRIPTION OF THE INVENTION

Hereinafter, the reactant (A) can also be indicated by the term "composition 1" and the reactant (B) by the term "composition 2".

The term "polyesters" here preferably indicates those polyesters which have repetitive ester units separated by alkylene chains and which are obtained by condensation of organic carboxylic acids and alcohols or by ring opening polymerization of lactones. The diol or polyol esters of polyethers containing polyether structure chains are not considered included in the above-mentioned definition.

The term "disecondary diamine" here indicates a compound which contains two secondary amino groups (—NH—), is free of primary amino groups (—NH$_2$) and in which all other nitrogen atoms, if any, are in the tertiary state, that is having no hydrogen atoms bound to them.

The weight ratio between (A) and (B) is such as to cause reaction of the —NCO groups with the —OH groups, in order to obtain a complete or partial reaction thereof, for example leaving a maximum of 15% by weight of —OH or —NCO groups as non-reacted. The moulding index depends mainly on this excess: in an embodiment according to the invention, a small quantity of —NCO groups is preferably left non-reacted, for example approximately 3%.

Gaseous compounds normally used in the art such as nitrogen, carbon dioxide or air can be cited as physical/chemical blowing agents; or low-boiling liquids like hydrocarbons, hydrofluorocarbons or similar; or microspheres of plastic material which melt and release air during the reaction of the polyurethane.

Said blowing agent, or the water, is added to the reactant (B) before it is mixed with the reactant (A).

When the blowing agent is water, it is present in said reagent (B) in quantities such that the ratio by weight between the component (b1), (b2), (b3) or (b4) and the water varies in the range 100-1 and 1-100.

Tertiary amines such as DABCO (1,4-Diazabicyclo[2.2.2]octane) or organometallic catalysts like DBTDL (Dibutyltin Dilaurate) can be cited, for example, as catalysts able to promote the formation of the urethane groups.

Said catalyst is generally added to the reactant (B) and in this case the ratio by weight between the component (b1), (b2), (b3) or (b4) and the catalyst is in the range 1,000-1 and 1-1,000, when the catalyst is a tertiary amine. When the catalyst is organometallic, its content is in the range 1000-10 ppm, preferably 200-50 ppm, with respect to the total content of (b1), (b2), (b3) or (b4) in the reactant (B).

However, also the reactant (A) may additionally contain a catalyst that promotes formation of the urethane groups during the reaction (A)+(B), of analogous type to the one cited above.

Preferably the reactant (A) is a prepolymer having a content of free —NCO groups in the range 4%-20% by weight.

Preferably in said prepolymer or reagent (A) the component (a1) composed of one or more aliphatic or cyclic diisocyanates, aromatic diisocyanates having one or more benzene rings, also condensed, naphtalenic diisocyanates, optionally substituted, and non-substituted diphenylenic diisocyanates.

More preferably said component (a1) is chosen from the group consisting of 1-isocyanate-4-[(4-isocyanatephenyl)methyl]benzene (4,4'-MDI), 2,4-diisocyanate-1-methyl-benzene (TDI), 2,6-diisocyanate-1-methyl-benzene, 1,5-naphthylene ester of isocyanic acid (NDI), 1,6-diisocyanatehexane (HDI), 5-isocyanate-1-(isocyanatemethyl)-1,3,3-trimethyl-cyclohexane (IPDI), 1-isocyanate-4-[(4-isocyanatecyclohexyl)methyl]cyclohexane (H12MDI), 1,4-diisocyanatecyclohexane.

In addition in said prepolymer or reagent (A) the component (a2a) is preferably composed of one or more macrodiols belonging to the polyadipate and polycaprolactone class as defined previously, having preferably a number average molecular weight in the range 2000-5000, more preferably in the range 2000-4000, or mixtures thereof; said macrodiol (a2a) can be optionally in admixture with one or more macropolyols (a2b) belonging to the polyester class, preferably polyadipates and polycaprolactones, having a number of —OH groups per molecule in the range 3-8, preferably 3-4, and a number average molecular weight in the range 500-4500, more preferably in the range 1000-3500; said mixture (a2a)+(a2b) being such as to have an average hydroxyl functionality below 3.

In the prepolymer (A), the presence of said macropolyols (a2b) belonging to the polyester class, preferably polyadipates and/or polycaprolactones, is preferred.

The reagent (B) is preferably a compound chosen from (b1) a diol or polyol with molecular weight or number average molecular weight below 300, preferably chosen from 1,4-butanediol, trimethylol-propane, ethylene glycol, diethylene glycol or mixtures thereof; or (b2) a primary or secondary aliphatic, cycloaliphatic amine or aliphatic, cycloaliphatic aromatic disecondary diamine or protected amine (e.g. blocked amine), with molecular weight below 300, or mixtures thereof, preferably ethylenediamine, diethylenetriamine, (b4) a mixture of (b1), (b2) as indicated above, and is in admixture with (b3) one or more macrodiols belonging to the polyester class, preferably polyadipates and polycaprolactones, having a number average molecular weight in the range 2000-5000, preferably 2000-4000 or mixtures thereof;

said compounds (b1), (b2), (b3), (b4) being optionally in admixture with:

(a2b) one or more macropolyols belonging to the polyester class, preferably polyadipates and polycaprolactone, having a number of —OH groups per molecule in the range 3-8, preferably 3-4, and a number average molecular weight in the range 300-6000, preferably 500-4500, more preferably below 1000, the mixture forming the reagent (B) being such as to have a mean hydroxyl functionality below 3.

In the reaction (A)+(B) which leads to formation of the polyurethanes according to the invention, the macrodiols (a2a), (b3) and/or macropolyols (a2b) can also be added separately to the mixture formed by the reagent (A) and the reagent (B) not containing said macrodiols (a2a), (b3) and/or macropolyols (a2b).

In a preferred embodiment according to the present invention the reagent (B) also comprises the macrodiols (b3).

Particularly advantageous for the present invention is the provision that at least one of the polyester components macrodiols (a2a), macropolyols (a2b) or macrodiols (b3) be a polycaprolactone.

Additionally, still more advantageous is the presence of macropolyols (a2b) among the reactants used for obtaining the polymer of the present invention, also when at least one of the components macrodiols (a2a), macropolyols (a2b) or macrodiols (b3) is a polycaprolactone.

When present in the prepolymer (A), the macropolyols (a2b) are used in a quantity generally below 6% by weight. The same can be repeated when said macropolyols (a2b) are in the reagent (B) but preferably have a number average molecular weight below 1000 while having preferably a number average molecular weight in the range of 2000-3000 when the macropolyols (a2b) are present in the prepolymer (A).

If present, the macropolyols (a2b) are added to the reagent (A) and/or to the reagent (B) in quantities such as to bring to complete or partial reaction the total —OH groups with the —NCO groups as described previously, preferably leaving a small part of the —NCO groups as non-reacted, generally around 3%.

Particularly preferred as reactant (a2a) is a mixture of a polyester macrodiol based on adipic acid having a number average molecular weight of about 4000 with a polycaprolactone macrodiol having a number average molecular weight of about 2000.

An example of a preferred embodiment of the prepolymer (A) is a prepolymer having a —NCO group content equal to approximately 15.9% by weight and formed of the following components:
(a1) MDI with molecular weight 250 and equivalent weight 125;
(a2a) polymer of (2-hydroxyethoxy)ethan-2-ol+2-ethyl-2-(hydroxymethyl)-1,3-propanediol with number average molecular weight 3,800 and functionality 2 (polyester macrodiol based on adipic acid and mixed glycols);
(a2a) polymer of 2-oxapanone with 2,2-dimethyl-1,3-propanediol (caprolactone macrodiol) having number average molecular weight of 2000 and equivalent weight 977.

A preferred embodiment of the reagent (B) is a mixture comprising, for example, the following components:
(b1) 1-4, butanediol;
(b3) polymer of 2-oxapanone with 2,2-dimethyl-1,3-propanediol with a number average molecular weight of 2000 and equivalent weight of 977 (polycaprolactone macrodiol);
(a2b) polymer of 2-oxapanone with 2-ethyl-2-(hydroxymethyl)-1,3-propanediol with a number average molecular weight of 540 and equivalent weight of 180 (caprolactone-based macropolyol).

A preferred embodiment of polyurethanes is the one resulting from the reaction of the preferred prepolymer (A) cited above and the preferred reagent (B) described above.

The reaction between the macrodiols (a2a) (plus the optional macropolyols (a2b)) and the di- or polyisocyanates (a1) which gives rise to the prepolymer or reagent (A) is conducted according to the known technique. For example, the isocyanates react at 50-100° C. with macrodiols (a2a)+polyester macropolyols (a2b) in an inert atmosphere or under a vacuum for 1-8 hours. Completion of the reaction is monitored by titration of the residual —NCO groups according to the known technique.

The reagent (A) can also be mixed with one or more additives such as plasticisers, surface-active agents, stabilisers, lubricants and anti-abrasion agents, such as those typically used for the elastomeric polymers provided that said additives do not impair the mechanical properties of the polymer as such.

Examples of said additives are liquid polybutadiene (with number average molecular weight around 9500) to increase the mouldability; benzoyl chloride as stabiliser; siloxane modified with polyether (polyether modified siloxane and polysiloxane, for example Tegostab B8960, B8950) and C7-C9 alkyl benzyl phthalate (Alkyl (C7-C8-C9) Benzyl Phthalate) to aid moulding (plasticiser).

The reagent (A) can also optionally contain organic or inorganic fillers. If present, they are used in quantities in the range 0.1-5.0% by weight with respect to the total composition (B).

High molecular weight plastics, linear or branched polyamides can be cited, for example, as organic fillers; silica gel, carbon black and zeolite can be cited as examples of inorganic fillers.

The reaction between reagent (A) and reagent (B) can occur following the techniques known in the art of preparation of polyurethanes, for example by pouring reagent (A) and (B), previously prepared and kept in respective containers, into a suitable mixing device, for example
dynamic head mixer
reactor with mixing efficiency
high pressure mixing machine
back-current mixer
static mixer
a combination of the above devices
and subsequently casting the reaction mixture consisting of reagent (A)+reagent (B) into a suitable closed mould at atmospheric pressure or under pressure (higher than the atmospheric pressure), and kept in said condition from 10 to 115 minutes at a temperature from 15° C. to 115° C.

It is also possible to cast the reaction mixture into the mould at atmospheric pressure and then increase the pressure of said mould or reduce it to below atmospheric pressure according to the density desired for the microcellular foam product.

It is understood that the polyurethanes of the present invention can also be obtained in one single phase in which the macrodiols (a2a) and the optional macropolyols (a2b) are first mixed with the reagent (B) as defined above, then the water (or other blowing agent) is added to the mixture obtained and subsequently the diisocyanate and/or polyisocyanate (a1) are added.

Once the microcellular foam product has been obtained, a post-curing stage is preferably carried out according to the known technique, choosing appropriate times and temperature profiles for the product, for example in an oven at 30-100° C. for a time between 12 and 36 hours, in order to guarantee completion of the reaction between alcohol and isocyanate groups.

The final polymer and the relative manufactured articles are characterised by a unique combination of tensile, dynamic, mechanical and physical-chemical properties. In particular said polymers and the relevant products show the following combination of properties (see characterisation in the examples):

| | |
|---|---|
| Tensile strength (Tb) | 4-35 MPa (also after ageing) |
| Elongation at break (Eb) | ≥300% |
| Compression set | ≤20%, pref. ≤11 |
| Surface abrasion resistance (Taber) | ≤6 mg/1000r |
| Low temperature impact strength (Charpy) (−70° C., 4 hours) | ≥30 KJ/m2 |
| $K_{STA}$ | 20-26 kN/mm |
| $K_{DYN}/K_{STA}$ | ≤1.5 |
| Fatigue test duration | 3,000,000 cycles no crack, δ ≤ 10%, ε ≤ 20% |
| Density | 0.25-1.15 g/cm³ | where $K_{STA}$ represents the static rigidity (understood as the ratio between load and deformation sustained) and $K_{DYN}/K_{STA}$ represents the ratio between dynamic and static rigidity measured as described below in the characterisation.

The polymers and manufactured articles obtainable from said polymers in accordance with the invention can be used in several application sectors where different properties are required simultaneously such as, for example, mechanical properties, elastic recovery, resistance to oil and resistance to surface abrasion, in particular manufactured articles suitable for undergoing high variable loads and vibrations.

Typical examples of manufactured articles that can be produced using the polymers of the present invention are, for example, shock absorbers for railway lines (pads and bumpers) and for transport in general, bumpers for cars and other vehicles, rollers for the preparation of paper, dampers, elastomeric conveyor belting, connections between moving parts, rollers for the paper industry and similar.

It should be noted that the shock absorbers, in particular for railway lines, are required to last for no less than 8 years or sustain an overall passage of weight amounting to no less than 600,000,000 tons.

Numerous variations and detail modifications, within the reach of a person skilled in the art, can be made to these embodiments of the invention, said variations and modifications nevertheless falling within the scope of the invention expressed by the attached claims.

Some illustrative but non-limiting examples of the present invention are provided below.

EXAMPLES

Characterisation

OH Content
It is measured by the OH value (mg KOH/g sample).
Tensile Strength (Tb)
This was evaluated according to the ISO 1798:1997 standard, before ageing and after ageing. 6 samples of each manufactured article are taken and 3 of them are tested before ageing and the remaining 3 are tested after ageing. The ageing is performed in temperature conditions of 100±2° C. for 96 hours in compliance with ISO 188:1998.
Elongation at Break (Eb)
This was evaluated according to the ISO 1798:1997 standard, before ageing and after ageing. 6 samples of each manufactured article are taken and 3 of them are tested before ageing and the remaining 3 are tested after ageing. The ageing is performed in temperature conditions of 100±2° C. for 96 hours in compliance with ISO 188:1998.
Compression Set
This was evaluated according to the ISO 1856 standard. 6 samples of each manufactured article are taken which are then split into two groups and undergo the test in temperature conditions of 70±1° C. and 30% compression for 22 hours.

Resistance to Surface Abrasion (Taber)
This was evaluated according to the ASTM D 1044 standard.
Low Temperature Impact Strength (−70° C., 4 Hours) (Charpy)
This was evaluated according to the ISO 179-1982 standard with an amplitude of 70 mm from the support line. The sample taken from the manufactured article with dimensions 15 mm (length)×12 mm (width) is immersed in a solution of dry ice and ethanol at −70° C. for 4 hours. The test is performed no longer than 15 seconds after extraction of the sample from the bath.
Volumetric Expansion in Oil (%)
This was evaluated according to the ISO 1817:2005 standard. The sample is immersed in oil (mobile oil #46) for 72 hours at 23±2° C.
Static Rigidity ($K_{STA}$)
This was evaluated using the Chinese standard KKJ[2007]-207 which prescribes compliance with the ISO 2859-1:1999 standard, using the following conditions:
Preload: 100 kN, twice
Speed: 2-3 kN/s, 20 kN-70 kN, repeated 3 times to obtain a mean value.

$$K_{STA}=(F_2-F_1)/(D_2-D_1)$$

For applications like railway bumpers and railway pads, a static rigidity of type A which should be approximately 35 (±5) kN/mm and a static rigidity of type B which should be approximately 25 (−5~0) kN/mm are evaluated: type A is considered in the examples.
Ratio Between Dynamic and Static Rigidity ($K_{DYN}/K_{STA}$)
This was evaluated using the Chinese standard KKJ[2007]-207 where the dynamic rigidity is measured on the same sample as the one used to evaluate the static rigidity.
The dynamic rigidity was calculated using the following conditions:
Preload: 100 kN, twice
Real test: 20 kN-70 kN, 4±1 Hz, 1000 times, considering 10 values in the last 100 repetitions to obtain a mean value $K_{DYN}=(F_{2a}-F_{1a})/(D_2-D_1)$, said ratio should be no higher than 1.5.
Fatigue Test Duration
This was evaluated using the Chinese standard KKJ[2007]-207 which prescribes the performance of 3 million impacts and evaluation of the presence or otherwise of cracks, with compression set no higher than 10% (δ) and static rigidity variation no higher than 20% (ε), using the following test conditions
Preload: 100 kN, twice
Test: 20 kN-80 kN, 4±1 Hz, 3,000,000 times $$\delta=(H_0-H_1)/H_0$$

$$\epsilon=(K_{S0}-K_{S1})/K_{S0}$$

Composition of the Materials Used in the Examples
(a2a), (b3) Macrodiols
Bester 262: polyester macrodiol based on adipic acid (hexanoic acid) and mixed glycols with a number average molecular weight of 3800 and a functionality equal to 2 [(2-hydroxyethoxy)ethan-2-ol+2-ethyl-2-(hydroxymethyl)-1,3-propanediol];
Terathane 2900: polytetramethylene ether glycol (PT-MEG) with functionality 2 and a number average molecular weight of 2900;
Terathane 2000: polytetramethylene ether glycol (PT-MEG) with functionality 2 and a number average molecular weight of 2000

(a2b) Macropolyols

Diexter G173: saturated polyester macropolyol based on adipic acid (hexanedioic acid) and mixed glycols with number average molecular weight of 2700 and a functionality equal to 3 ([(2-hydroxyethoxy)ethan-2-ol+2-ethyl-2-(hydroxymethyl)-1,3-propanediol]);

Additives-Catalysts

Lithene N4-9000: liquid polybutadiene with number average molecular weight 9500 (additive to increase the mouldability);

Tegostab B8960: polyether modified siloxane;

Tegostab B 8950: polyether modified polysiloxane;

DABCO 33LV: 1,4-Diazabicyclo[2.2.2]octane in a 33% solution in glycol (catalyst);

Expancell: microspheres of plastic material which melt and release air during the reaction of the polyurethane (blowing agent).

Tested Samples

The polyurethane polymers obtained from the examples have been moulded in form of pads having dimensions of 280 mm×148 mm, with a thickness of 12 mm, and including three holes for the installation.

Examples 1-7 of Preparation of the Prepolymer (A)

Composition 1

Example 1

Composition 1 (C11)

51.0 Kg of MDI with molecular weight 250 and equivalent weight 125 are loaded in a 200 liter reactor provided with thermometer, mechanical stirrer and inert gas inlet; the product is fed as a liquid at 80° C. and kept at the same temperature in the reactor.

20.0 Kg of Bester 262 (polyester macrodiol (a2a)—MnW 3800 and equivalent weight 1870) preheated to 80° C., and 25.6 Kg of the polymer of 2-oxepanone with 2,2-dimethyl-1,3-propanediol (caprolactone macrodiol (a2a)) having number average molecular weight 2000 and equivalent weight 977, also preheated to 80° C., are then charged.

It is left under stirring for 2 hours and the temperature increases to 85° C. due to the exothermic reaction. 450 g of Lithene N4-9000 are then added. The reaction is completed under stirring at 85° C. for a further 3 hours.

The prepolymer thus obtained has a —NCO group content equal to approximately 15.9%.

Example 2

Composition 1 (C12)

16.0 Kg of Bester 262 (polyester macrodiol (a2a)—MnW 3800 and equivalent weight 1870), preheated to 80° C., 25.6 Kg of the polymer of 2-oxepanone with 2,2-dimethyl-1,3-propanediol (polycaprolactone macrodiol (a2a)) with number average molecular weight 2000 and equivalent weight 977, also preheated to 80° C., are charged into a 200 liter reactor provided with thermometer, mechanical stirrer, inert gas inlet and feeding hopper for solids.

3.0 Kg of Diexter G173 (polyester macropoliol (a2b)) with number average weight 2700 and equivalent weight 910 are then added.

The internal temperature is raised to 130° C. and 40.0 Kg of naphthylene diisocyanate (NDI) with molecular weight 210 and equivalent weight 105 are loaded by hopper in an inert atmosphere. It is left to react at 130° C. for 2 hours. 450 g of Lithene N4-9000 are then added. The reaction is completed under stirring at 130° C. for a further 3 hours.

The prepolymer thus obtained has a —NCO group content equal to approximately 16.9%.

Example 3

Composition 1 (C13)

16.0 Kg of Bester 262 (MnW 3800 and equivalent weight 1870, (a2a)), preheated to 80° C., and 35.6 Kg of the polymer of 2-oxepanone with 2,2-dimethyl-1,3-propanediol (polycaprolactone macrodiol (a2a)) with number average molecular weight 2000 and equivalent weight 977, also preheated to 80° C., are loaded in a 200 liter reactor provided with thermometer, mechanical stirrer, inert gas inlet and feeding hopper for solids.

5.0 Kg of Diexter G173 (polyester macropoliol with number average weight 2700 and equivalent weight 910, (a2b)) are then added.

The internal temperature is raised to 90° C. and 47.0 Kg of 1-isocyanate-4-[(4-isocyanatecyclohexyl)methyl]cyclohexane (H12MDI) with molecular weight 262 and equivalent weight 131 are loaded by hopper in an inert atmosphere. It is left to react at 90° C. for 2 h. 500 g of Lithene N4-9000 are then added. The reaction is completed under stirring at 90° C. for a further 3 hours (h).

The prepolymer thus obtained has a —NCO group content equal to approximately 13.6%.

Example 4

Composition 1 (C14)

15.0 Kg of the polymer of 2-oxepanone with 2,2-dimethyl-1,3-propanediol (polycaprolactone diol (a2a)) with number average molecular weight 1000 and equivalent weight 498, preheated to 80° C., and also 28.0 Kg of the polymer of 2-oxapanone with 2,2-dimethyl-1,3-propanediol (caprolactone macrodiol (a2a)) with number average weight 2000 and equivalent weight 977, also preheated to 80° C., are loaded in a 200 liter reactor provided with thermometer, mechanical stirrer, inert gas inlet and feeding hopper for solids.

6.0 Kg of Diexter G173 (number average molecular weight 2700 and equivalent weight 910 (a2b)) are then added. The internal temperature is raised to 90° C. and 25.0 Kg of MDI with molecular weight 250 and equivalent weight 125 and 20 Kg of TODI with molecular weight 264 and equivalent weight 132 are loaded by hopper in an inert atmosphere. It is left to react at 90° C. for 2 h. The reaction is completed under stirring at 90° C. for a further 3 h.

The prepolymer thus obtained has a —NCO group content equal to approximately 12.7%.

Example 5

Composition 1 (C15)

31.0 Kg of MDI with molecular weight 250 and equivalent weight 125 are loaded in a 200 liter reactor provided with thermometer, mechanical stirrer and inert gas inlet; the product is fed as a liquid at 80° C. and kept at the same temperature in the flask.

20.0 Kg of Bester 262 (MnW 3800 and equivalent weight 1870, (a2a)), preheated to 80° C., and also 95.6 Kg of the polymer of 2-oxapanone with 2,2-dimethyl-1,3-propanediol (caprolactone macrodiol (a2a)) with number average molecular weight 2000 and equivalent weight 977, also preheated to 80° C., are then loaded in order to bring the —NCO content in the prepolymer to approximately 4%.

It is left under stirring for 2 h and the temperature increases to 85° C. due to the exothermic reaction. 400 g of Lithene N4-9000 are then added. The reaction is completed under stirring at 85° C. for a further 3 h.

The prepolymer thus obtained has a —NCO group content equal to approximately 3.98%.

Example 6

Composition 1 (C16)

Analogously to example 5, 40.0 Kg of MDI with molecular weight 250 and equivalent weight 125 are loaded in a 200 liter reactor provided with thermometer, mechanical stirrer and inert gas inlet; the product is fed as a liquid at 80° C. and kept at the same temperature in the flask.

22.0 Kg of Bester 262 (MnW 3800 and equivalent weight 1870, (a2a)), preheated to 80° C., and 31.0 Kg of the polymer of 2-oxapanone with 2,2-dimethyl-1,3-propanediol (caprolactone macrodiol (a2a)) with number average molecular weight 2000 and equivalent weight 977, also preheated to 80° C., are then charged.

It is left under stirring for 2 h and the temperature increases to 85° C. due to the exothermic reaction. 500 g of Lithene N4-9000 are then added. The reaction is completed under stirring at 85° C. for a further 3 h.

The prepolymer thus obtained has a —NCO group content equal to approximately 12.4%.

Example 7

Comparative

Composition 1 (C17) Containing Polyethers 50.0 Kg of MDI with molecular weight 250 and equivalent weight 125 are loaded in a 200 liter reactor provided with thermometer, mechanical stirrer and inert gas inlet; the product is fed as a liquid at 80° C. and kept at the same temperature in the flask.

20.0 Kg of Terathane 2900 (polytetramethylene ether glycol—MnW 2900 and equivalent weight 1400) preheated to 80° C., and 30.0 Kg of Terathane 2000 (polytetramethylene ether glycol—MnW 2000 and equivalent weight 1000), also preheated to 80° C., are then charged.

It is left under stirring for 2 h and the temperature increases to 85° C. due to the exothermic reaction. 500 g of Lithene N4-9000 are then added. The reaction is completed under stirring at 85° C. for a further 3 h.

The prepolymer thus obtained has a —NCO group content equal to approximately 14.8%.

Examples 8-17 of Preparation of the Reagent (B)

Composition 2

Example 8

Composition 2 (C21)

92.3 Kg of the polymer of 2-oxapanone with 2,2-dimethyl-1,3-propanediol (polycaprolactone macrodiol (b3)) with number average molecular weight 2000 and equivalent weight 977 are loaded in a 200 liter flask provided with mechanical stirrer and inert gas inlet.

The mass is brought to 65° C. by heating with external oil bath.

0.35 Kg of the polymer of 2-oxapanone with 2-ethyl-2-(hydroxymethyl)-1,3-propanediol (caprolactone-based macropolyol (a2b)) with number average molecular weight 540 and equivalent weight 180 are added.

The mixture is left to homogenise at temperature for 30', then 400 g of Tegostab B8960 and 200 g of Tegostab B 8950 are added and left to mix for a further 30'. 3.5 Kg of C7-C9 alkyl benzyl phthalate (plasticizing additive to aid moulding) are then added and left to mix for a further hour at 65° C.

1.2 Kg of 1,4-butanediol preheated to 25° C. (molecular weight 90 and equivalent weight 45), 1.2 Kg of demineralised water and 800 g of DABCO 33LV (2,2,2 diazabicyclo octane in 33% solution in glycol—catalyst) are charged into the reactor.

Example 9

Composition 2 (C22)

100 Kg of the polymer of 2-oxapanone with 1,4-butanediol (polycaprolactone macrodiol (b3)) with number average molecular weight 3000 and equivalent weight 1450 are loaded in a 200 liter flask provided with mechanical stirrer and inert gas inlet. The mass is brought to 70° C. by heating with external oil bath.

2.0 Kg of the polymer of 2-oxapanone with 2-ethyl-2-(hydroxymethyl)-1,3-propanediol (caprolactone-based macropolyol (a2b)) with number average molecular weight 540 and equivalent weight 180 are added. The mixture is left to homogenise at temperature for 30', then 300 g of Tegostab B8960 and 150 g of Tegostab B 8950 are added and left to mix for a further 30'. 3.0 Kg of C7-C9 alkyl benzyl phthalate (plasticizing additive to aid moulding) are then added and left to mix for a further hour at 65° C.

1.0 Kg of 1,4-butanediol preheated to 25° C. (molecular weight 90 and equivalent weight 45), 1.4 Kg of demineralised water and 700 g of DABCO 33LV are loaded.

Example 10

Composition 2 (C23)

50.0 Kg of the polymer of 2-oxapanone with 1,4-butanediol (polycaprolactone macrodiol (b3)) with number average weight 3000 and equivalent weight 1450 and 60.0 Kg of the polymer of 2-oxapanone with 2,2-dimethyl-1,3-propanediol (caprolactone macrodiol (b3)) with number average molecular weight 2000 and equivalent weight 977 are loaded in a 200 liter flask provided with mechanical stirrer and inert gas inlet. The mass is brought to 65° C. by heating with an external oil bath.

2.0 Kg of the polymer of 2-oxapanone with 2-ethyl-2-(hydroxymethyl)-1,3-propanediol (caprolactone-based macropolyol (a2b)) with number average molecular weight 540 and equivalent weight 180 are added. The mixture is left to homogenise at temperature for 30 minutes, then 300 g of Tegostab B8960 and 500 g of Tegostab B 8950 are added and left to mix for a further 30 minutes. 4.0 Kg of C7-C9 alkyl benzyl phthalate (plasticizing additive to aid moulding) are then added and left to mix for a further hour at 65° C.

0.4 Kg of 1,4-butanediol preheated to 25° C. (molecular weight 90 and equivalent weight 45), 1.8 Kg of demineralised water and 800 g of DABCO 33LV are loaded.

Example 11

Composition 2 (C24)

1.5 Kg of 1,4-butanediol preheated to 25° C. (molecular weight 90 and equivalent weight 45), 1.0 Kg of demineralised water and 400 g of DABCO 33LV are loaded in a 10 liter flask provided with thermometer, mechanical stirrer and inert gas inlet. 500 g of the polymer of 2-oxapanone with 2-ethyl-2-(hydroxymethyl)-1,3-propanediol (caprolactone-based macropolyol (a2b)) with number average weight 540 and equivalent weight 180 are added. 500 g of Tegostab B8960 and 300 g of Tegostab B 8950 are then added and left to mix for a further 30 minutes.

Example 12

Composition 2 (C25)

Analogously to example 11, 1.5 Kg of 1,4-butanediol preheated to 25° C. (molecular weight 90 and equivalent weight 45), 1.5 Kg of demineralised water and 400 g of DABCO 33LV are loaded in a 10 liter flask provided with thermometer, mechanical stirrer and inert gas inlet. 500 g of Tegostab B8960 and 200 g of Tegostab B 8950 are then added and left to mix for a further 30 minutes.

Example 13

Composition 2 (C26)

90.1 Kg of the polymer of 2-oxapanone with 2,2-dimethyl-1,3-propanediol (caprolactone macrodiol (b3)) with number average weight 2000 and equivalent weight 977 are loaded in a 200 liter flask provided with mechanical stirrer and inert gas inlet. The mass is brought to 65° C. by heating with external oil bath.

500 g of Tegostab B8960 and 300 g of Tegostab B 8950 are added and left to mix and homogenise for 30 minutes. 4.0 Kg of C7-C9 alkyl benzyl phthalate (plasticizing additive to aid moulding) are then added and left to mix for a further hour at 65° C.

1.5 Kg of 1,4-butanediol (molecular weight 90 and equivalent weight 45), preheated to 25° C., 1.2 Kg of demineralised water and 800 g of DABCO 33LV are loaded in the reactor, leaving the mixture under stirring for a further 30 minutes.

Example 14

Composition 2 (C27)

91.5 Kg of the polymer of 2-oxapanone with 2,2-dimethyl-1,3-propanediol (caprolactone macrodiol (b3)) with number average molecular weight 2000 and equivalent weight 977 are loaded in a 200 liter flask provided with mechanical stirrer and inert gas inlet. The mass is brought to 65° C. by heating with external oil bath.

0.5 Kg of the polymer of 2-oxapanone with 2-ethyl-2-(hydroxymethyl)-1,3-propanediol (caprolactone-based macropolyol (a2b)) with number average molecular weight 540 and equivalent weight 180 are added. The mixture is left to homogenise at temperature for 30 minutes. 400 g of Tegostab B8960 and 200 g of Tegostab B 8950 are added, and left to mix and homogenise for 30'. 3.5 Kg of C7-C9 alkyl benzyl phthalate (plasticizing additive to aid moulding) are then added and left to mix for a further hour at 65° C. 1.0 Kg of Expancell is added and the mixture is left to homogenize in a closed flask for 90 minutes at 65° C.

1.2 Kg of 1,4-butanediol preheated to 25° C. (molecular weight 90 and equivalent weight 45), 1.0 Kg of demineralised water and 800 g of DABCO 33LV are loaded in the reactor, leaving the mixture under stirring for a further 30 minutes.

Example 15

Comparative

Composition 2 (C28) Containing Polyether 90.5 Kg of Terathane 2000 with number average molecular weight 2000 and equivalent weight 977 are loaded in a 200 liter flask provided with mechanical stirrer and inert gas inlet. The mass is brought to 65° C. by heating with external oil bath.

500 g of Tegostab B8960 and 300 g of Tegostab B 8950 are added and left to mix and homogenise for 30 minutes, then 4.0 Kg of C7-C9 alkyl benzyl phthalate (plasticizing additive to aid moulding) are added and left to mix for a further hour at 65° C.

1.5 Kg of 1,4-butanediol preheated to 25° C. (molecular weight 90 and equivalent weight 45), 1.2 Kg of demineralised water and 800 g of DABCO 33LV are loaded in the reactor, leaving the mixture under stirring for a further 30 minutes.

Example 16

Comparative

Composition 2 (C29) not Containing Water 90.5 Kg of Terathane 2000 with number average weight 2000 and equivalent weight 977 are loaded in a 200 liter flask provided with mechanical stirrer and inert gas inlet. The mass is brought to 65° C. by heating with external oil bath, then 500 g of Tegostab B8960 and 300 g of Tegostab B 8950 are added and left to mix and homogenise for 30'. 4.0 Kg of C7-C9 alkyl benzyl phthalate (plasticizing additive to aid moulding) are then added and left to mix for a further hour at 65° C.

1.5 Kg of 1,4-butanediol preheated to 25° C. (molecular weight 90 and equivalent weight 45), 1.2 Kg of demineralised water and 800 g of DABCO 33LV are loaded in the reactor, leaving the mixture under stirring for a further 30 minutes.

Example 17

Comparative

Composition 2 (C30) not Containing Water

A composition 2 is prepared analogous to that of example 8 (C21) but without adding water.

92.3 Kg of polymer of 2-oxapanone with 2,2-dimethyl-1,3-propanediol (caprolactone macrodiol (b3)) with number average weight 2000 and equivalent weight 977 are loaded in a 200 liter flask provided with mechanical stirrer and inert gas inlet. The mass is brought to 65° C. by heating with external oil bath.

0.35 Kg of the polymer of 2-oxapanone with 2-ethyl-2-(hydroxymethyl)-1,3-propanediol (caprolactone-based macropolyol (a2b)) with number average molecular weight 540 and equivalent weight 180 are added.

The mixture is left to homogenise at temperature for 30 minutes, then 400 g of Tegostab B8960 and 200 g of Tegostab B 8950 are added and left to mix for a further 30 minutes. 3.5 Kg of C7-C9 alkyl benzyl phthalate (plasticizing additive to aid moulding) are then added and left to mix for a further hour at 65° C.

2.4 Kg of 1,4-butanediol preheated to 25° C. (molecular weight 90 and equivalent weight 45) and 800 g of DABCO 33LV (catalyst) are loaded in the reactor.

Examples 18-28 of Preparation of the Polyurethane (A)+(B)

Example 18

Formulation a

The formulation is obtained by using the compositions described in the example 1 (C11) and example 8 (C21) in the following quantities:

C11 64.2 Kg (NCO=15.9)
C21 88.6 Kg (OH=147.5 mg KOH/g)

The mixture C11 is loaded in the tank 1, kept at 45° C., of a machine for metering and mixing resins for hot-moulded microcellular elastomers. For example a Castech ER-3310 produced by Tecnoelastomeri, Italy, can be used.

The composition C21 kept at 60° C. is loaded in the tank 2; the tank is blanketed with inert gas.

The mixtures of the two tanks are fed into the mixing head which is kept at ambient temperature, the product is cast as a viscous resin into the appropriate moulds and the polymerisation is completed by oven post curing at 30-100° C. for 12 to 36 hours in order to guarantee completion of the reaction between alcohol and isocyanate groups, unless an excess of hydroxyl or isocyanate groups has been used.

The polymer obtained has an excess of NCO groups equal to approximately 2-5% by weight.

The application tests—mechanical, surface and chemical resistance—are conducted after 2 weeks of ageing at ambient temperature and 50% relative humidity. The properties of the final polymer, in form of a pad, are summarised in table 1.

Example 19

Formulation b

The formulation is obtained by using the compositions described in the examples 2 (C12) and 9 (C22) in the following quantities C12 75 Kg (NCO=16.9)
C22 120.0 Kg (OH=136.2 mg KOH/g)

The composition C12 is loaded in the tank, kept at 90° C., of a machine for metering and mixing resins for hot-moulded microcellular elastomers. For example a Castech ER-3310 produced by Tecnoelastomeri, Italy, can be used.

The composition C22 kept at 60° C. is loaded in the tank 2; the tank is blanketed with inert gas. The mixtures of the two tanks are fed into the mixing head which is 90° C., the product is cast as a viscous resin into the appropriate moulds and the polymerisation is completed by oven post curing at 30-100° C. for 12 to 36 hours in order to guarantee completion of the reaction between alcohol and isocyanate groups, unless an excess of hydroxyl or isocyanate groups has been used.

The polymer obtained has an excess of NCO groups equal to approximately 2-5% by weight.

The application tests—mechanical, surface and chemical resistance—are conducted after 2 weeks of ageing at ambient temperature and 50% relative humidity. The properties of the final polymer, in form of a pad, are summarised in table 1.

Example 20

Formulation c

The formulation is obtained by using the compositions described in the examples 3 (C13) and 10 (C23) in the following quantities C13 50.0 Kg (NCO=13.6)
C23 60.0 Kg (OH=150.9 mg KOH/g)

The composition C13 is loaded in the tank 1, kept at 50° C., of a machine for metering and mixing resins for hot-moulded microcellular elastomers. For example a Castech ER-3310 produced by Tecnoelastomeri, Italy, can be used.

The composition C23 kept at 60° C. is loaded in the tank 2; the tank is blanketed with inert gas.

The mixtures of the two tanks are fed into the mixing head which is 90° C., the product is cast as a viscous resin into the appropriate moulds and the polymerisation is completed by oven post curing at 30-100° C. for 12 to 36 hours in order to guarantee completion of the reaction between alcohol and isocyanate groups, unless an excess of hydroxyl or isocyanate groups has been used.

The polymer obtained has an excess of NCO groups equal to approximately 2-5% by weight.

The application tests—mechanical, surface and chemical resistance—are conducted after 2 weeks of ageing at ambient temperature and 50% relative humidity. The properties of the final polymer, in form of a pad, are summarised in table 1.

Example 21

Comparative

Example 18 has been repeated while adding an antistatic/conductive additive to the formulation a, in amounts about 4% by weight on the total weight of the final composition (A+B).

The antistatic additive was a 80% solution of trimethyl-dodecyl-ammonium ethyl sulphate in ethanediol. The ratio between NCO and OH (total) has been maintained the same as used in example 18.

This new formulation is obtained by using the compositions described in the example 1 (C11) and example 8 (C21) wherein the C21 of example 8 has been modified by adding an Antistatic agent AS formed by 80% solution of trimethyl-dodecyl-ammonium ethyl sulphate in ethanediol: 88.6 Kg are blended in a small blender with 6.80 Kg of AS (80% solution of trimethyldodecyl-ammonium ethyl sulphate in ethanediol). The final OH of the solution is 162.7.

This resulting mixture has been used in a such amount as to maintain the same ratio (stoichiometry) between NCO/OH (total) as used in example 18. Thus the new ratio between the composition described in the example 1 (C11) and the composition of example 8 (C21) including the AS (C21*) is as follows:

C11 64.2 Kg (NCO=15.9)
C21* 80.4 Kg (OH=162.7 mg KOH/g)

The mixture C11 is loaded in the tank 1, kept at 45° C., of a machine for metering and mixing resins for hot-moulded microcellular elastomers. For example a Castech ER-3310 produced by Tecnoelastomeri, Italy, can be used.

The composition C21, with AS (C21*), kept at 60° C. is loaded in the tank 2; the tank is blanketed with inert gas.

The mixtures of the two tanks are fed into the mixing head which is kept at ambient temperature, the product is cast as a viscous resin into the appropriate moulds and the polymerisation is completed by oven post curing at 30-100° C. for 12 to 36 hours in order to guarantee completion of the reaction between alcohol and isocyanate groups, unless an excess of hydroxyl or isocyanate groups has been used.

The polymer obtained has an excess of NCO groups equal to approximately 2-5% by weight.

The application tests—mechanical, surface and chemical resistance—are conducted after 2 weeks of ageing at ambient temperature and 50% relative humidity. The properties of the final polymer, in form of a pad, are summarised in table 1.

Example 22

Formulation e

The formulation is obtained by using the compositions without macropolyols (a2b) described in the examples 6 (C16) and 13 (C26) in the following quantities C16 50.0 Kg (NCO=12.4)
C26 52.2 Kg (OH=151.5 mg KOH/g)

The composition C16 is loaded in the tank 1, kept at 50° C., of a machine for metering and mixing resins for hot-moulded microcellular elastomers. For example a Castech ER-3310 produced by Tecnoelastomeri, Italy, can be used.

The composition C26 kept at 60° C. is loaded in the tank 2; the tank is blanketed with inert gas.

The mixtures of the two tanks are fed into the mixing head which is 90° C., the product is cast as a viscous resin into the appropriate moulds and the polymerisation is completed by oven post curing at 30-100° C. for 12 to 36 hours in order to guarantee completion of the reaction between alcohol and isocyanate groups, unless an excess of hydroxyl or isocyanate groups has been used.

The polymer obtained has an excess of NCO groups equal to approximately 2-5% by weight.

The application tests—mechanical, surface and chemical resistance—are conducted after 2 weeks of ageing at ambient temperature and 50% relative humidity. The properties of the final polymer, in form of a pad, are summarised in table 1.

Example 23

Formulation f

The formulation is obtained using the compositions described in the examples 1 (C11) and 14 (C27) in the following quantities C11 81.0 Kg (NCO=15.9)

C27 122.3 Kg (OH=135.0 mg KOH/g)

The composition C11 is loaded in the tank 1, kept at 50° C., of a machine for metering and mixing resins for hot-moulded microcellular elastomers. For example a Castech ER-3310 produced by Tecnoelastomeri, Italy, can be used.

The composition C27 kept at 57° C. is loaded in the tank 2; the tank is blanketed with inert gas.

The mixtures of the two tanks are fed into the mixing head which is 70° C., the product is cast as a viscous resin into the appropriate moulds and the polymerisation is completed by oven post curing at 30-100° C. for 12 to 36 hours in order to guarantee completion of the reaction between alcohol and isocyanate groups, unless an excess of hydroxyl or isocyanate groups has been used.

The polymer obtained has an excess of —NCO groups equal to approximately 2-5% by weight.

The application tests—mechanical, surface and chemical resistance—are conducted after 2 weeks of ageing at ambient temperature and 50% relative humidity. The properties of the final polymer, in form of a pad, are summarised in table 1.

Example 24

Formulation g

The formulation is obtained using the compositions described in the examples 5 (C15) and 12 (C25), both not containing the macropolyols (a2b), in the following quantities C15 96.0 Kg (NCO=3.98)

C25 1.83 Kg (OH=2780.0 mg KOH/g)

The composition C15 is loaded in the tank 1, kept at 50° C., of a machine for metering and mixing resins for hot-moulded microcellular elastomers. For example a Castech ER-3310 produced by Tecnoelastomeri, Italy, can be used.

The composition C25 kept at 47° C. is loaded in the tank 2; the tank is blanketed with inert gas.

The mixtures of the two tanks are fed into the mixing head which is 70° C., the product is cast as a viscous resin into the appropriate moulds and the polymerisation is completed by oven post curing at 30-100° C. for 12 to 36 hours in order to guarantee completion of the reaction between alcohol and isocyanate groups, unless an excess of hydroxyl or isocyanate groups has been used.

The polymer obtained has an excess of —NCO groups equal to approximately 2-5% by weight.

The application tests—mechanical, surface and chemical resistance—are conducted after 2 weeks of ageing at ambient temperature and 50% relative humidity. The properties of the final polymer, in form of a pad, are summarised in table 1.

Example 25

Formulation h

The formulation is obtained using the compositions described in examples 5 (C15) not containing the macropolyols (a2b), and example 11 (C24) containing the macropolyols (a2b), in the following quantities C15 92.5 Kg (NCO=3.98)

C24 2.36 Kg (OH=2009.3 mg KOH/g)

The composition C15 is loaded in the tank 1, kept at 50° C., of a machine for metering and mixing resins for hot-moulded microcellular elastomers. For example a Castech ER-3310 produced by Tecnoelastomeri, Italy, can be used.

The composition C24 kept at 43° C. is loaded in the tank 2; the tank is blanketed with inert gas.

The mixtures of the two tanks are fed into the mixing head which is 70° C., the product is cast as a viscous resin into the appropriate moulds and the polymerisation is completed by oven post curing at 30-100° C. for 12 to 36 hours in order to guarantee completion of the reaction between alcohol and isocyanate groups, unless an excess of hydroxyl or isocyanate groups has been used.

The polymer obtained has an excess of —NCO groups equal to approximately 2-5% by weight.

The application tests—mechanical, surface and chemical resistance—are conducted after 2 weeks of ageing at ambient temperature and 50% relative humidity. The properties of the final polymer, in form of a pad, are summarised in table 1.

Example 26

Comparative a

The formulation is obtained using the compositions described in the example 1 (C11) and comparative example 16 (C29) in the following quantities:

C11 65.2 Kg (NCO=15.9)

C29 86.1 Kg (OH=155 mg KOH/g)

and does not contain water.

The composition C16 is loaded in the tank 1 of a machine for metering and mixing resins for hot-moulded microcellular elastomers. For example a Castech ER-3310 produced by Tecnoelastomeri, Italy, can be used.

The composition C29 kept at 70° C. is loaded in the tank 2; the tank is blanketed with inert gas.

The mixtures of the two tanks are fed into the mixing head which is 90° C., the product is cast as a viscous resin into the appropriate moulds and the polymerisation is completed by oven post curing at 30-100° C. for 12 to 36 hours in order to guarantee completion of the reaction between alcohol and isocyanate groups, unless an excess of hydroxyl or isocyanate groups has been used.

The application tests—mechanical, surface and chemical resistance—are conducted after 2 weeks of ageing at ambient temperature and 50% relative humidity. The properties of the final polymer, in form of a pad, are summarised in table 1.

Example 27

Comparative b

The formulation is obtained using the compositions described in the comparative example 7 (C17) and comparative example 15 (C28) in the following quantities:

C17 72.2 Kg (NCO=14.8)
C28 92.4 Kg (OH=149.6 mg KOH/g)

The mixture C17 is loaded in the tank 1, kept at 55° C., of a machine for metering and mixing resins for hot-moulded microcellular elastomers. For example a Castech ER-3310 produced by Tecnoelastomeri, Italy, can be used.

The composition C28 kept at 70° C. is loaded in the tank 2; the tank is blanketed with inert gas.

The mixtures of the two tanks are fed into the mixing head which is kept at ambient temperature, the product is cast as a viscous resin into the appropriate moulds and the polymerisation is completed by oven post curing at 30-100° C. for 12 to 36 hours in order to guarantee completion of the reaction between alcohol and isocyanate groups, unless an excess of hydroxyl or isocyanate groups has been used.

The product obtained contains polyethers substituting the polyesters.

The application tests—mechanical, surface and chemical resistance—are conducted after 2 weeks of ageing at ambient temperature and 50% relative humidity. The properties of the final polymer, in form of a pad, are summarised in table 1.

Example 28

Comparative

The formulation is obtained using the compositions described in the example 1 (C11) and comparative example 17 (C30) in the following quantities:

C11 64.2 Kg (NCO=15.9)
C30 151.2 Kg (OH=640.2 mg KOH/g)

The mixture C11 is loaded in the tank 1, kept at 45° C., of a machine for metering and mixing resins for hot-moulded microcellular elastomers. For example a Castech ER-3310 produced by Tecnoelastomeri, Italy, can be used.

The composition C30 kept at 60° C. is loaded in the tank 2; the tank is blanketed with inert gas.

The mixtures of the two tanks are fed into the mixing head which is kept at ambient temperature, the product is cast as a viscous resin into the appropriate moulds and the polymerisation is completed by oven post curing at 30-100° C. for 12 to 36 hours in order to guarantee completion of the reaction between alcohol and isocyanate groups, unless an excess of hydroxyl or isocyanate groups has been used.

The polymer obtained has an excess of —NCO groups equal to approximately 2-5% by weight.

The application tests—mechanical, surface and chemical resistance—are conducted after 2 weeks of ageing at ambient temperature and 50% relative humidity. The properties of the final polymer, in form of a pad, are summarised in table 1.

TABLE 1

| | Ex. 18 | Ex. 19 | Ex. 20 | Ex. 21 (com) | Ex. 22 | Ex. 23 | Ex. 24 | Ex. 25 | Ex. 26 (com) | Ex. 27 (com) | Ex. 28 (com) |
|---|---|---|---|---|---|---|---|---|---|---|---|
| Comp. | Form a | Form b | Form c | Antis. | Form e | Form f | Form g | Form h | no water | Polyethers | no water |
| C11 | X | | | X | | | X | | X | | X |
| C12 | | X | | | | | | | | | |
| C13 | | | X | | | | | | | | |
| C14 | | | | | | | | | | | |
| C15 | | | | | | | X | | X | | |
| C16 | | | | | X | | | | | | |
| C17 | | | | | | | | | | X | |
| C21 | X | | | | | | | | | | |
| C21 + AS | | | | X | | | | | | | |
| C22 | | X | | | | | | X | | | |
| C23 | | | X | | | | | X | | | |
| C24 | | | | | | | | | X | | |
| C25 | | | | | | X | | | | | |
| C26 | | | | | X | | X | | | | |
| C27 | | | | | | | | X | | | |
| C28 | | | | | | | | | | X | |
| C29 | | | | | | | | | X | | |
| C30 | | | | | | | | | | | X |
| Tb (MPa) | 6.2 | 6.4 | 5.8 | 4.0 | 4.6 | 7.2 | 8.2 | 8.4 | 35.0 | 2.2 | 25.2 |
| Tb after ageing | 6.0 | 6.3 | 5.0 | 3.4 | 4.4 | 6.8 | 7.4 | 7.8 | 34.4 | 1.8 | 26.8 |
| Eb (%) | 500 | 550 | 370 | 360 | 660 | 480 | 490 | 580 | 460 | 480 | 580 |
| Eb after ageing | 540 | 580 | 410 | 390 | 710 | 500 | 530 | 620 | 520 | 560 | 660 |
| Expans. vol. in oil (%) | 3.4 | 3.3 | 3.9 | 4.5 | 4.8 | 3.5 | 3.5 | 4.6 | 0.7 | 6.4 | 0.4 |
| Comp. Set (%) | 8.7 | 8.0 | 16.8 | 11.0 | 10.5 | 8.4 | 8.6 | 9.2 | 12.5 | 3.6 | 16.6 |
| Taber Mg/1000 r | 4.5 | 5.0 | 5.6 | 6.6 | 3.1 | 4.8 | 4.6 | 4.0 | 1.8 | 4.2 | 1.2 |
| Charpy-70° C. | 38 | 31 | 30 | 38 | 40 | 36 | 42 | 40 | 56 | 12 | 33 |
| Ksta | 22.5 | 23.4 | 21.6 | 19.1 | 20.9 | 23.2 | 23.2 | 22.8 | 111.1 | 23.4 | 121.1 |
| Kdin/Ksta | 1.31 | 1.26 | 1.44 | 1.52 | 1.40 | 1.29 | 1.30 | 1.32 | 1.15 | 1.26 | 1.18 |

TABLE 1-continued

|  | Ex. 18 | Ex. 19 | Ex. 20 | Ex. 21 (com) | Ex. 22 | Ex. 23 | Ex. 24 | Ex. 25 | Ex. 26 (com) | Ex. 27 (com) | Ex. 28 (com) |
|---|---|---|---|---|---|---|---|---|---|---|---|
| Fatigue prop. thick (%) | 2.5 | 2.3 | 5.8 | 7.0 | 2.4 | 2.7 | 3.1 | 3.9 | 3.6 | 4.8 | 3.8 |
| Fatigue prop. Ksta (%) | 5.6 | 6.0 | 12.2 | 14.0 | 7.8 | 5.9 | 6.2 | 7.4 | 7.4 | 10.2 | 8.8 |

From examination of the data in table 1, it emerges that the non-foamed polyurethanes like those in example 25 (Comparative) have a far higher $K_{STA}$ (111.1) than the polyurethanes of the invention and outside the range of values allowed for applications like railway bumpers and railway pads or applications where resistance to vibration and oscillating and temporary loads is required.

Furthermore the polyether-based foamed polyurethanes like those in example 26 (comparative) have load resistance properties (Tb) far inferior to the polyurethanes of the present invention, and inferior properties of resistance to volumetric expansion in oil and inferior impact strength at low temperature (Charpy).

Furthermore it should be noted that the foamed polyurethanes of the examples 18-25 are able to meet the following technical specifications generally required of railway pads and bumpers:

| No. | Items |  | Units | Standards |
|---|---|---|---|---|
| 1 | Tensile strength | Before ageing | MPa | ≥4.0 |
|  |  | After ageing | MPa | ≥3.4 |
| 2 | Elongation at break | Before ageing | % | ≥200 |
|  |  | After ageing | % | ≥170 |
| 3 | Compression set |  | % | ≤20 |
| 4 | Working resistance |  | Ω | ≥10⁹ |
| 5 | Volume expansibility in oil resistance (mobile oil #46, 72 hours) |  | % | ≤5 |
| 6 | Surface Taber abrasion |  | Mg/1000 revolutions | ≤6 |
| 7 | Impact strength in low temperature (−70° C., 4 hours) |  | KJ/m² | ≥30 |
| 8 | $K_{STA}$ |  | kN/mm | 20-26 |
| 9 | $K_{DYN}/K_{STA}$ |  |  | ≤1, 5 |
| 10 | Fatigue prop thick (δ) 3.000.000 cycle no crack |  | % | ≤10 |
| 11 | Fatigue prop Ksta (e) 3.000.000 cycle no crack |  | % | ≤20 |

In particular it should be noted that the polyurethane of example 18 shows the best combination of properties, in particular mechanical strength (Tb), elastic recovery (compression set) and resistance to vibration ($K_{STA}$).

Additionally the addition of known antistatic agents results in a detriment of the mechanical properties, in particular the $K_{STA}$ does not meet the technical specifications generally required of railway pads and bumpers (see comparative example 21 in comparison with example 18).

The invention claimed is:

1. A microcellular polyurethane or polyurethane-urea foam elastomer, consisting of the reaction product of a reagent (A) with a reagent (B), in the presence of a catalyst for formation of urethane and/or ureic groups, wherein:
reagent (A) consists of a prepolymer having a —NCO free group content of between 2%-25% by weight, optionally admixed with one or more additives, plasticizers, surface-active agents, stabilizers, lubricants, or fillers, the prepolymer consisting of a reaction product of:
(a1) one or more aliphatic, cycloaliphatic and/or aromatic polyisocyanates, excluding 3,3'-dimethyl-4,4'-diphenyl diisocyanate (TODI); with
(a2a) one or more polyester macrodiols, having a number average molecular weight of between 600-6000 and a number of —OH groups per molecule equal to about 2, said one or more polyester macrodiols (a2a) being optionally in admixture with
(a2b) one or more polyester macropolyols having a number average molecular weight of between 300-6000, and a number of —OH groups per molecule of between 3-8, said (a2a)+(a2b) mixture having an average hydroxyl functionality lower than 3;
and wherein:
reagent (B) consists of a blowing agent admixed with a compound selected from the group consisting of:
(b1) a diol or polyol having a molecular weight or number average molecular weight lower than 500;
(b2) an amine compound having a molecular weight lower than 500, wherein the amine compound is selected from the group consisting of a primary or secondary, aliphatic or cycloaliphatic monoamine; an aliphatic, cycloaliphatic, or aromatic disecondary diamine; a blocked amine; and a mixture thereof;
(b3) one or more polyester macrodiols having a number average molecular weight of between 500-6000 and a number of —OH groups per molecule equal to about 2; and
(b4) a mixture of two or more compounds (b1), (b2) and (b3) as above defined,
one or more of said compounds (b1), (b2), (b3), (b4) being optionally in admixture with
(a2b) one or more polyester macropolyols having a number average molecular weight of between 300-6000, and a number of —OH groups per molecule of between 3-8, the reagent (B) having an average hydroxyl functionality lower than 3;
with the proviso that:
no antistatic agent is contained in the elastomer; and
said one or more polyester macropolyols (a2b) are contained in at least one of reagent (A) and reagent (B).

2. The elastomer according to claim 1, wherein one or more of the one or more polyester macrodiols (a2a), the one or more polyester macropolyols (a2b) and the one or more polyester macrodiols (b3), are selected from the group consisting of polyadipates, polycaprolactones, and mixtures thereof.

3. The elastomer according to claim 2, wherein at least one of the one or more polyester macrodiols (a2a), one or more polyester macropolyols (a2b) and one or more polyester macrodiols (b3) is a polycaprolactone.

4. The elastomer according to claim 1, wherein the (a1) are one or more of
aliphatic or cycloaliphatic diisocyanates, aromatic diisocyanates having one or more benzene rings, which may be condensed,
optionally substituted naphthalenic diisocyanates, and non-substituted diphenylenic diisocyanates.

5. The elastomer according to claim 1, wherein the (a1) are selected from the group consisting of:
- 1-isocyanate-4-[(4-isocyanatephenyl)methyl]benzene (4,4'-MDI),
- 2,4-diisocyanate-1-methyl-benzene (TDI),
- 2,6-diisocyanate-1-methyl-benzene,
- 1,5-naphthylene ester of isocyanic acid (NDI),
- 1,6-diisocyanatehexane (HDI),
- 5-isocyanate-1-(isocyanatemethyl)-1,3,3-trimethyl-cyclohexane (IPDI),
- 1-isocyanate-4-[(4-isocyanatecyclohexyl)methyl]-cyclohexane (H12MDI), and
- 1,4-diisocyanatecyclohexane.

6. The elastomer according to claim 1, wherein the one or more polyester macrodiols (a2a) of reagent (A) and the one or more polyester macrodiols (b3) of reagent (B) have a number average weight between 2000-5000.

7. The elastomer according to claim 1, wherein
the one or more polyester macrodiols (a2a) are in admixture with the one or more polyester macropolyols (a2b) in the reagent (A), and said one or more polyester macropolyols (a2b) in the reagent (A) have number average molecular weight between 1000-3500,
and the one or more of said compounds (b1), (b2), (b3), and (b4) are in admixture with the one or more polyester macropolyols (a2b) in the reagent (B), and said one or more polyester macropolyols (a2b) in the reagent (B) have a number average molecular weight lower than 1000.

8. The elastomer according to claim 1, wherein the blowing agent is selected from the group consisting of water, nitrogen, carbon dioxide, air, low-boiling liquids, hydrocarbons, hydrofluorocarbons, and melting microspheres of plastic material which release air during the polyurethane formation reaction.

9. The elastomer according to claim 1, wherein the reagent (B) comprises the (b3) one or more polyester macrodiols.

10. The elastomer according to claim 1, wherein one or more additives, plasticizers, surface-active agents, stabilizers, lubricants, or fillers are present in reagent (A).

11. Process for preparing the microcellular polyurethane or polyurethane-urea foam elastomer as defined by claim 1, the process comprising:
preparing the reagent (A), at a temperature of 50° C.-100° C. and in an inert atmosphere or under vacuum,
mixing the reagent (A) with the reagent (B) to form a mixture, and
casting the mixture of reagent (A)+reagent (B) in a closed mould under conditions comprising a pressure of one atmosphere or greater, and maintaining said conditions for 10 to 115 minutes, at a temperature between 15° C. and 115° C., to form said elastomer,
and optionally post-curing the elastomer at 30° C.-100° C., for 12 to 36 hours.

12. A manufactured article selected from the group consisting of: pads for transportation vehicles, bumpers for transportation vehicles, rollers for manufacturing of paper, dampers, elastomeric conveyor belting, and connections between moving parts, said article comprising the microcellular polyurethane or polyurethane-urea foam elastomer as defined in claim 1.

13. The elastomer according to claim 1, wherein said prepolymer in reagent (A) has a —NCO free group content of between 4%-20% by weight.

14. The elastomer according to claim 1, wherein the one or more polyester macrodiols (a2a) of reagent (A) and the one or more polyester macrodiols (b3) of reagent (B) have a number average weight between 2000-4000.

15. The elastomer according to claim 1, wherein the reagent (A) consists of said prepolymer having a —NCO free group content of between 2%-25% by weight and one or more additives, plasticizers, surface-active agents, stabilizers, lubricants, or fillers.

* * * * *